Feb. 13, 1934.   L. J. MEYER   1,946,633
FOLDABLE RACK
Filed Jan. 27, 1931
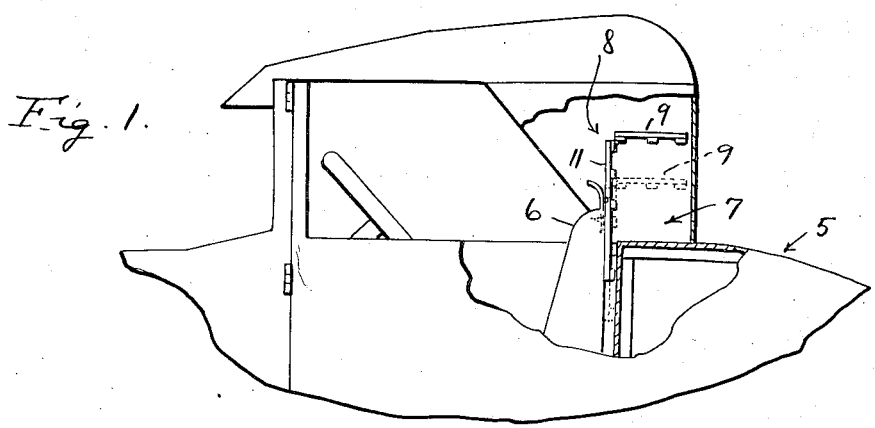
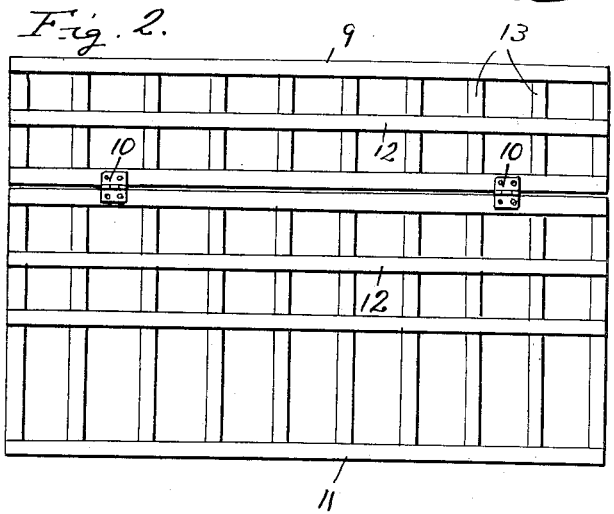
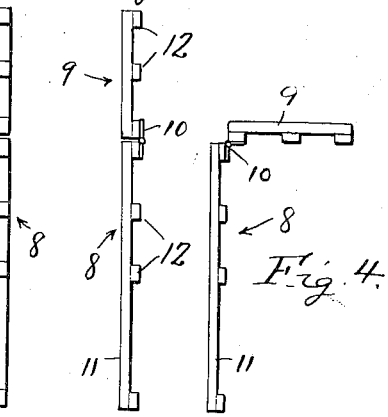
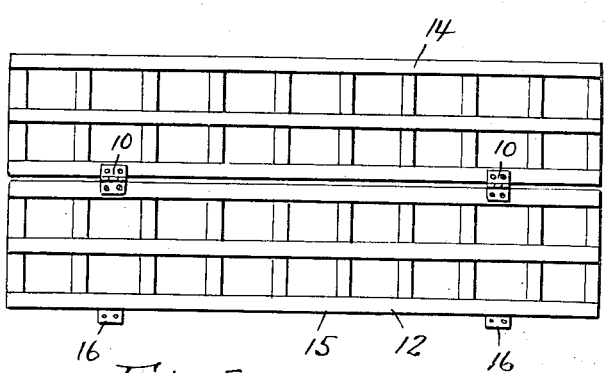
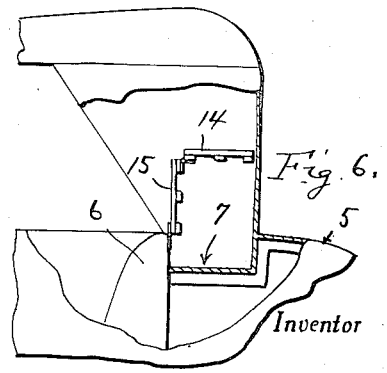
Inventor
Lewis J. Meyer
By Clarence A. O'Brien
Attorney Patented Feb. 13, 1934

1,946,633

UNITED STATES PATENT OFFICE 1,946,633

FOLDABLE RACK

Lewis J. Meyer, Tererro, N. Mex.

Application January 27, 1931. Serial No. 511,603

2 Claims. (Cl. 296—37)

This application is a continuation in part of application Serial No. 470,731 filed July 25, 1930, and represents an improvement thereon.

This invention relates generally to folding racks, particularly to a folding rack adapted to be disposed in the space behind the seat of a coupé or roadster body of an automobile, whereby to increase the carrying capacity and utility of said space, and prevent the displacement and falling out of objects placed in said space.

It is an object of this invention to provide a simple, rugged and inexpensive rack of this type which will very materially increase the safe carrying capacity of the space behind the seat in a coupé or roadster automobile, which is readily and quickly adjusted into a variety of positions, and which when not in use, may be folded and disposed out of the way, or out of sight.

These and other objects of the invention, its nature and its composition and arrangement and combination of parts will be readily understood by anyone acquainted with the art to which this invention relates upon consulting the following description of the drawing in which:

Figure 1 is a broken away view of a coupé body, of an automobile, showing the manner of placement of one form of my improved rack.

Figure 2 is a back view of the folder rack displayed in Figure 1 showing the same in fully extended position.

Figure 3 is an edge view of Figure 2, and

Figure 4 is a view similar to Figure 3 showing the upper hinged portion of the rack disposed at right angles to the lower part of the rack.

Figure 5 is another form of my improved rack, and

Figure 6 is a cut away view similar to Figure 1 disclosing the disposal and the manner of use of the form of my rack disclosed in Figure 5.

Referring in detail to the drawing the numeral 5 generally designates the automobile body referred to and the numeral 6 the seat back and the numeral 7 refers generally to the space behind the seat 6 between the back of the seat and the inward side of the rear wall of the body compartment, and the numeral 8 refers generally to one form of my improved rack which is composed of a lattice 9 of generally narrow elongated proportions which is hinged by means of the hinges 10 to the upper member of a relatively wider lattice 11. The lattice 11 has its lower portion free of such cross members as are indicated at 12 in order that it may have a sliding relation with respect to the back of the seat, without interference from such cross members, to a degree to be limited by the lowermost cross member 12' and the next one above it, in any suitable manner known to the art. This is to provide that the rack lattice section 11 may be permanently vertically supported in slidable relation as shown in Figure 1 whereby the height of the rack may be variably adjusted. As particularly well illustrated in Figures 3 and 4 the cross members 12 are placed on the rear or under side of the lattices 9 and 10. In other words, the short vertical members 13 are on the upper side of the long cross members 12 and 12' and at right angles thereto or in any suitable relationship whereby to produce the generally rectangular form of the lattice sections. The dotted lines in Figure 1 illustrate the lowermost position of the rack and the folding of the lattice 9 as seen in Figure 4, to confine a comparatively small amount of material or packages in the space between the seat and the rear wall of the automobile compartment. The full lines in Figure 1 disclose the full vertical extension thereof, with the upper lattice section 9 disposed at right angles to the section 11. The hinges 10, it will be seen in the drawing, are attached at the rear sides of the lattice sections, so that the natural opening limit of the hinges also limits the swinging of the upper lattice section 9 beyond the horizontal.

In the type of rack illustrated in Figures 1 to 4 inclusive, a special arrangement of a suitable type must be made to provide for the sliding of the rack section 11 behind the seat 6, but in the form of rack disclosed in Figures 5 and 6, no such special arrangements are arranged or necessary to install the rack. In the form now shown in Figures 5 and 6, the rack comprises a pair of identically proportioned lattice sections 14 and 15, both of which are of approximately the same size. Hinges 10 produce the same relative co-operation existing in the type of rack already described above. On the front side of lowermost cross member of the lower rack section 15 is attached a pair or a greater number of hinges 16 which are adapted to be fastened to the back of the seat at the desired height. The sections 14 and 15 can then be relatively adjusted so that one may be horizontal while the other is vertical and the reverse, and it is also evident that they may be folded completely out of sight behind the seat when the rack is not in use. In the position shown in Figure 3, the upper lattice section will not fall forward, but will hold packages or the like confined in the space behind the seat. The same advantageous condition is produced when the corresponding upper lattice section 14 of the modified form of the invention described, is placed in the vertical position. Likewise, the lower lattice section 15 of the modified form may be mounted so as not to swing forwardly over the seat.

In any event they are always immediately available for increasing to different extents the carrying capacity of the space behind the seat.

I desire to have it understood also that the rack herein described may be made in one or two or more sections. The sections, may be made of any suitable material and they may be mechanically related by hinges or any other suitable means.

It will therefore be definitely understood that I do not desire to limit the application of this invention to the particular modifications set out herein to illustrate the principles thereof, and any change or changes may be made in the material, arrangement and combination of parts consistent with the spirit and scope of the invention.

Having thus described my invention, what I claim as new is:

1. In combination, a coupé automobile having a package space behind its seat, the back of said seat rising above the floor of said space, said floor having an opening therein adjacent said back of the seat, a vertical member arranged in said opening and supported by said back of the seat and the sides of said opening, said vertical member being vertically slidable relative to said floor and said back of the seat to bring the same to the desired height, a swingable member, hinge means connecting one edge portion of said swingable member to an upper part of said vertical member whereby said swingable member may be swung rearwardly from a vertical position above said vertical member to a depressed position to the rear of said vertical member, means on said swingable member arranged to engage means on said vertical member when said swingable member is in said vertical position whereby said swingable member is prevented from being swung forwardly of said vertical position.

2. In combination, a coupé automobile having a package space behind its seat, the back of said seat rising above the floor of said space, said floor having an opening therein adjacent said back of the seat, a vertical member arranged in said opening and supported by said back of the seat and the sides of said opening, said vertical member being vertically slidable relative to said floor and said back of the seat to bring the same to the desired height, a swingable member, hinge means connecting one edge portion of said swingable member to an upper part of said vertical member whereby said swingable member may be swung rearwardly from a vertical position above said vertical member to a depressed position to the rear of said vertical member, means on said swingable member arranged to engage means on said vertical member when said swingable member is in said vertical position whereby said swingable member is prevented from being swung forwardly of said vertical position, but may be swung rearwardly, said swingable member being designed to engage the front side of packages when in said vertical position and rest upon the top of packages when in a depressed rearward position for retaining the packages in said package space.

LEWIS J. MEYER.